April 2, 1957          J. KOPP          2,787,300
INSERTED TOOTH SAW AND BITS AND SHANKS THEREFOR
Filed March 30, 1954          2 Sheets-Sheet 1
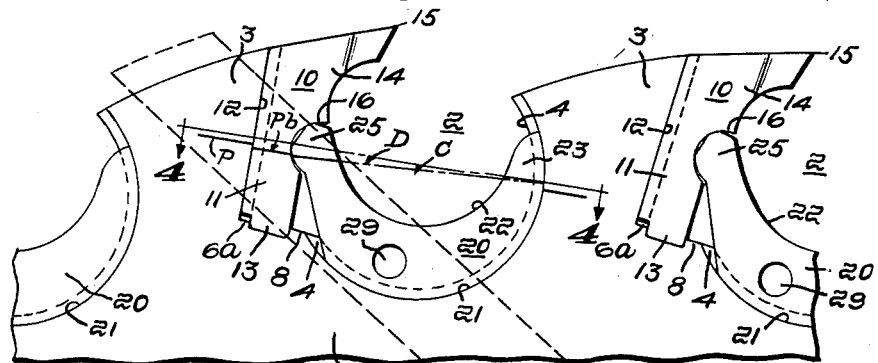
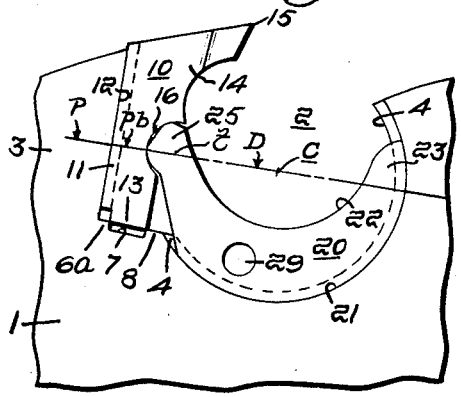
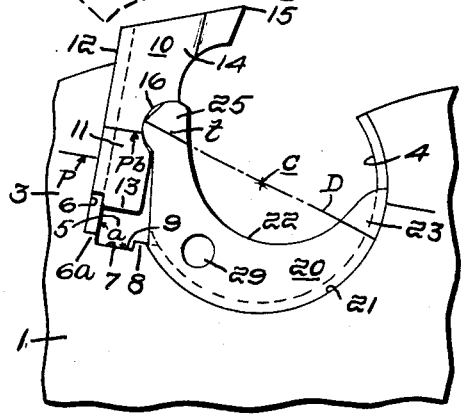
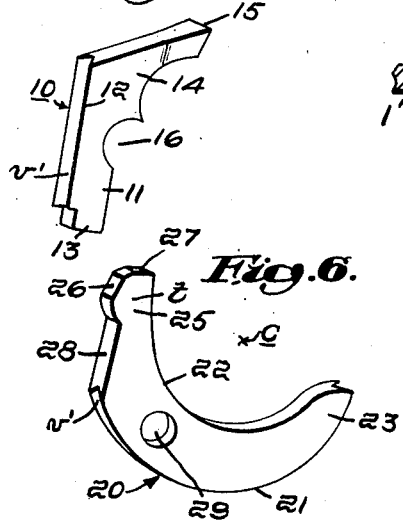
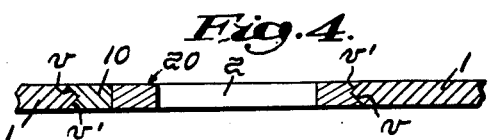
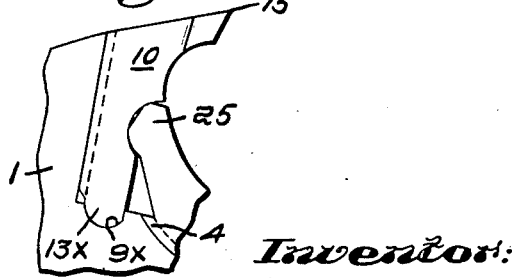
Inventor:
John Kopp, April 2, 1957 J. KOPP 2,787,300
INSERTED TOOTH SAW AND BITS AND SHANKS THEREFOR
Filed March 30, 1954 2 Sheets-Sheet 2
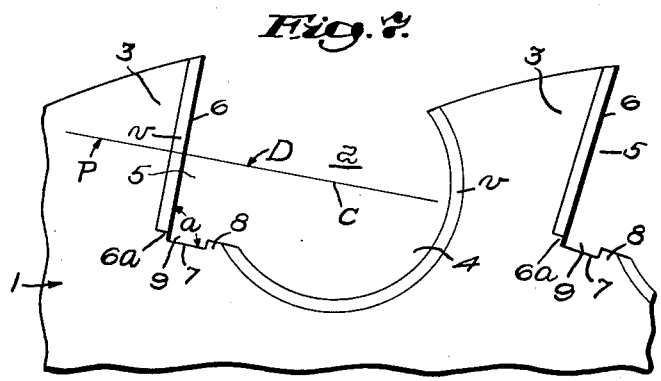
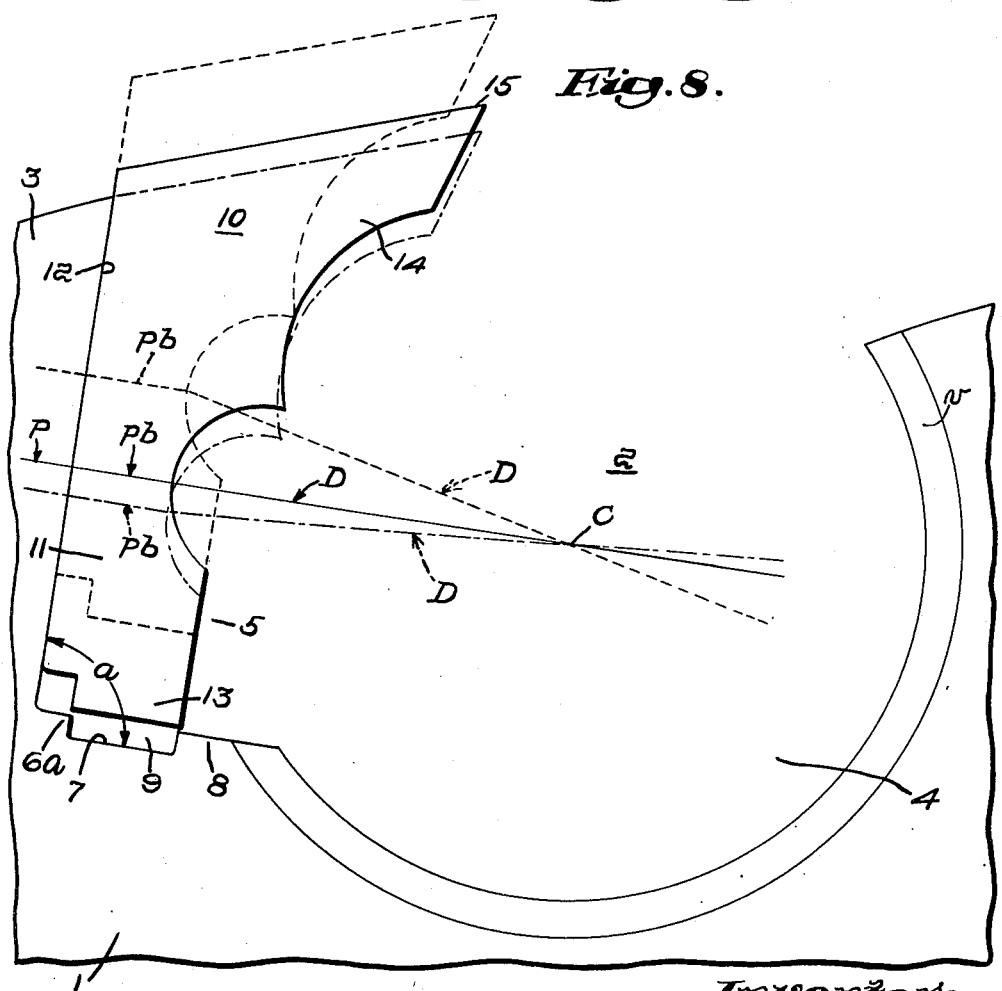
Inventor:
John Kopp,
By Emery, Booth, Townsend, Miller & Weidner
Attys United States Patent Office 2,787,300
Patented Apr. 2, 1957

2,787,300

INSERTED TOOTH SAW AND BITS AND SHANKS THEREFOR

John Kopp, Lunenburg, Mass., assignor to Simonds Saw & Steel Co., Fitchburg, Mass., a corporation of Massachusetts Application March 30, 1954, Serial No. 419,705

1 Claim. (Cl. 143—151)

This invention relates to saws, particularly circular saws, of the class generally referred to as inserted tooth. It aims to provide improved means whereby saws for general sawmill operation including head saws, edge saws and wing or rift saws are equipped with replaceable tooth elements comprising cutter bits and retaining shanks.

The saws, bits and shanks of the invention are especially suitable for the smaller sawmills where maintenance of a filing room is uneconomical. The instant improved construction and arrangement of the saw plate and the bits and shanks of the replacement teeth embodies a novel toggle locking principle, making for greater ease of insertion and removal of the parts and affording greater strength and solidity while presenting roomy open and well-shaped gullets for chambering sawdust and freeing it efficiently.

In the drawings illustrating by way of example one embodiment of the invention:

Fig. 1 is a side elevation of a peripheral portion of a circular saw having the insert bits and shanks installed and locked in use position;

Fig. 2 is a similar view illustrating a stage in the removal of a bit and shank pair, being that herein referred to as the "on-center position";

Fig. 3 is a view corresponding to Figs. 1 and 2 showing the removal operation nearing completion, with the parts unlocked;

Fig. 4 is a cross-section on the line 4—4 of Fig. 1;

Fig. 5 shows a bit separately in perspective;

Fig. 5a, corresponding to a portion of Fig. 1, shows a modified bit latch;

Fig. 6 is a perspective view of a shank;

Fig. 7 is a side elevation of a peripheral portion of a saw plate such as that of Fig. 1 showing a socket or gullet area without the insert bit and shank; and Fig. 8 is a partly diagrammatic view illustrating the novel toggle principle involved in the invention.

Referring first more particularly to Fig. 7, the peripheral portion of a saw plate designated generally at 1 is formed with a multiplicity of equally spaced sockets 2 for the insert pairs of tooth bits 10 and shanks 20 to be described. The solid portions of the saw plate edge between succeeding sockets define the saw teeth proper or abutments 3.

The tooth bits 10 are of general half-T or inverted L-shape, resembling an upside-down boot with the foot non-perpendicular to the leg. The shanks 20 are integral pieces of general crescent shape, with the convex margin of each including somewhat more than 180° of arc so that both horns of the crescent project distinctly beyond a true diameter intersecting them. In the views the reference letter $c$ denotes the common center of the shank 20 and of the saw plate socket 2. With regard to the saw plate this center $c$ is located inwardly from the initial circular outline of the plate, so that the abutments or teeth proper 3 extend outwardly beyond it. In other words, more than a semi-circle of socket is contained within the saw plate. In the illustrated example substantially the entire circle, imagined, of the socket 2 is within the initial saw plate margin or is approximately internally tangent to it.

Each socket 2 comprises a circular segmental forward portion 4 described upon the center $c$, and an angular portion or recess 5 to the rear of and intersecting said segment area 4. The preferably straight rear wall of this recess 5 constitutes the leading wall of the corresponding abutment or tooth base proper 3. In each such socket 2 the angular recess 5 defines a seat for the corresponding bit 10, the recess and bit being shaped and dimensioned to conform each to the other. Likewise the segmental portion 4 of each socket provides a receiving and locking seat for the shank 20 of the insert pair, with capacity for sufficient rotary reciprocation of the shank in the socket in one and the opposite direction positively to lock in or to release the bit 10. As viewed on the drawings the locking-in rotation of the shank 20 is contra-clockwise, and the release rotation is clockwise. The relative proportions and extent of the segmental and the angular portions 4 and 5 of the saw plate sockets 2, and similarly of the bits 10 and shanks 20, may be varied over a substantial range depending somewhat on the size of the saw plate itself and the intended use for the saw.

In accordance with the present invention the location, shape and relative dimensioning of the segmental and the angular parts 4 and 5 of the saw plate sockets 2, and the conformant formation and dimensioning of the corresponding bits and shanks 10, 20 are devised and calculated to afford a true toggle-joint relation for the bit and shank in the saw plate socket together with a positive action of locking and releasing thereof.

For that purpose, one arm of the toggle is defined by the previously mentioned diameter across the horns of the crescent shank 20 and passing through the common center $c$ of the shank and the segmental arm 4 of the socket 2. Said toggle-arm defining diametral line of the shank is marked D on the figures.

The other arm of the toggle is defined by a perpendicular P across an intermediate part of the bit 10.

As will be apparent the relative construction, shaping, proportioning and arrangement of the bits 10 and the shank 20, and of the corresponding receiving locations 5 and 4 therefor on the saw plate are all calculated to afford the novel positive-locking toggle-joint action and interrelation as herein mainly concerned.

From the following description in connection with the drawings it will further be seen that the shank-defined arm D of the toggle is bodily revoluble with the shank about the center $c$ of the shank and of the socket segment 4. During such revolution of the shank 20 and the toggle-arm D thereof one tip of the shank has rotary slide thrust bearing in the socket segment 4, opposite to the bit 10, while the other shank tip has pivotal thrust bearing against the bit. The other toggle arm P defined by a perpendicular across the leg of the bit 10 is movable with the bit and in self-parallelism, between locked and unlocked positions of the bit, the latter having sliding thrust bearing with the straight rear wall of the saw plate recess 5 and being in pivotal engagement with the adjacent tip of the shank 20.

A further factor in the resultant positive-locking toggle action is the dimensioning and location of the socket 2 and the segmental and the angular recess portions 4 and 5 thereof with respect to the margin of the saw plate. This is made such that a line can be drawn perpendicular to the rear wall 6 of the angular recess 5, at a distance in from the saw plate margin suitable for applying thrust locking force to the corresponding bit, and which line can be extended diametrically through the center $c$ of the socket and so as to intersect the opposite segmental recess 4 of the socket substantially below the front outer end thereof. This perpendicular coincides with the toggle-arm P already mentioned, in the "on-center" position of the parts, the intermediate or transitional position between the locked and the unlocked status for the bit; Fig. 2. It occupies an intermediate and generally medial location at the straight rear wall 6 of the angular recess 5. Thus in general the radius for the socket 2 and segment 4 thereof equals or exceeds half the length or radial depth of the bit-seating angular recess 5.

The bit seating portion 5 of the socket has a bottom wall 7 defining with the rear wall 6 an included angle $a$ of at least 90°. Said recess bottom wall 7 is of a length to accommodate the foot of the bit and to provide between said bottom wall and the intersection of the recess 5 with the segmental portion 4 a shoulder 8 generally perpendicular to the bottom wall. The circular edge of the segmental area 4 and also the major length of the straight wall 6 at the rear of the bit recess is double bevelled as indicated at $v$, providing a general V-shape in section for guiding cooperation with like-formed grooves $v'$ at the corresponding edges of the bits 10 and shanks 20; see particularly Fig. 4.

Turning now to the bits 10 and shanks 20 individually, and taking first the bits, noting particularly Fig. 5, each bit 10 as a whole is of a general half-T or inverted L shape. Each comprises a leg 11 with a rear wall 12 grooved as at $v'$ for sliding fit at the complementally V-ed wall 6 of the recess 5 of the plate. At the lower or inner end the bit leg 11 has an extension or latch 13 dimensioned to seat against the bottom wall 7 of the recess and within the conformant pocket 9 behind the plate shoulder 8. While this inner end or latch portion of the bit may be variously proportioned with respect to the width of the leg, it preferably has its rear wall in line with the bottom of the V-groove $v'$ of the bit rear wall 12, while the bevelling of the plate recess wall 6 ends at or about at the top of the pocket 9 for the latch 13, at approximately the level of the shoulder 8. Thus, noting particularly Fig. 7, the saw plate is provided with a fillet $6a$ in the angle $a$ between the recess rear and bottom walls 6 and 7, thereby affording strength and crack resistance for the saw plate at the critical area at the base of the teeth 3.

Each bit 10 has at the outer end an arm 14 projecting forwardly in the general plane of the saw plate in the region of the circumference thereof in the installed position of the bit. By reason of the invention the circumferential extent of the bit can exceed that heretofore available for insert tooth bits, thereby affording the maximum of "hook" forwardly over the gullet. The forward portion of the bit arm terminates in an acute point formed in any usual or preferred manner to constitute the actual cutter member 15, whether by hardening and tempering of this active portion of the steel stock of the bit, or by making the bits of high-speed steel, or by providing an inlay or insert of hard wear-resistant material such as tungsten cobalt alloy for the tip portion. Depending on the material employed, the bit tips may be filed, swaged, ground or otherwise worked to present the laterally widened chisel-like cutting edge as at 15.

At the fore wall of the leg 11 of the bits 10 there is formed an arcuate and approximately semi-circular thrust bearing or pivotal seating recess 16. This bearing recess 16 is located at an intermediate and herein about medial portion of the bit leg 11, so that in the "on center" position of the bit, Fig. 2, said recess 16 is intersected centrally by the toggle-arm defining perpendicular P mentioned and by the other and diametral toggle-arm D, which lines in said position lie in prolongation of each other.

Considering now the other element of the insert pair for each socket 2 of the saw plate, namely the shanks 20, noting particularly Fig. 6, these consist of a one-piece crescentic body shaped and dimensioned for rotative seating in the socket 2. The convex margin 21 of the shank is peripherally conformant to the circular portion 4 of such socket 2 and has the mentioned V-grooving $v'$ for matching seat on the bevel edge $v$ thereof. The shank concave margin 22 has a general arcuate contour presenting with the outer portion of the bit 10 in the installed position a large roomy and well-shaped uninterrupted gullet for chambering and efficiently freeing the sawdust.

At the leading end the shank body terminates in a heel 23 at which the concave margin 22 curves reversely to the convex margin 21. The opposite and trailing end of the shank is formed with a locking toe 25 projecting rearward and of a substantially semi-circular shape and of a size to be received in the bearing recess 16 of the corresponding bit 10. This cam-like toe 25 is formed upon a center $t$ so selected that a line drawn through it and the center $c$ on which the plate socket 2 and the convex circular margin 21 of the shank are formed will when extended pass radially transversely across the respective end portions of the shank below the extremities thereof. In other words, the crescent-like body of the shank describes something more than 180° of arc, and the heel and toe extremities extend circumferentially beyond the diameter $c—t$.

At the arcuate rear face of the toe 25 there is provided about medially of the arc a flat 26 and spaced from the latter in the direction toward the concave margin of the shank a second flat or recedent area 27 which intersects said concave wall 22 of the gullet-forming side of the conforming edge of the shank. Below the toe proper 25, in the use position of the shank the latter is cut away along a chordal line joining the convex margin 21 and the inner base of the toe 25, defining a flat rear edge portion as at 28. The latter and the adjacent portion of the toe define a notch or recess providing adequate clearance with respect to the bit 10 to permit the insertion and removal of the latter and the attendant bodily rotation of the shank about the socket center $c$ in the locking and unlocking of the bit; in this regard compare Figs. 1 and 3.

Each shank 20 has at an intermediate portion of the body an aperture 29 for reception of a pin or a bar wrench or like tool for applying torque to the shank during installation or replacement of the corresponding bit. Such tool, a portion of which is shown dotted at $w$ in Fig. 1, may be merely a short bar turned at one end to provide a foot engageable over the edge of the saw plate and having the pin at one side face of the bar at appropriate distance from the foot to enter the pin-receiving aperture 29 of the shank. Such adjusting bar or wrench need be but a relatively short element, comparable in length for example to an ordinary pair of hand pliers, sufficient merely to receive the fingers of one hand on the free or handle end. This contrasts with the heavy long-handled instruments capable of transmitting large torque effort as heretofore requisite for wedging insert-teeth into place on saw plates.

The manner of inserting and positively locking up an insert pair comprising a bit 10 and a shank 20 will best be understood from the enlarged Fig. 8 viewed in connection with Figs. 1, 2 and 3. Starting with an empty socket 2 as in Fig. 7 a shank 20 is set into the socket and aligned with the saw plate by saddling the groove $v'$ of the circular edge of the shank onto the V-bevel of the circular portion 4 of the plate socket. In this initial stage the shank has a position turned clockwise viewing the figures from its ultimate installed position, the heel 23 being low and the toe 25 elevated. This provides entry space between the toe 25 and the straight rear wall 6 of the bit recess 5 of the socket adequate to admit the bit between them, the mating groove and bevel $v'$, $v$ of the bit and the wall 6 simultaneously locating the bit in the plane of the saw plate and of the shank. By turning the shank manually merely with the operator's fingers the bit is moved inward along a straight line to the engaged but unlocked position such as that of Fig. 3 and of the broken line showing of Fig. 8. In this position it will be noted that the diameter D and the perpendicular P are at an angle to each other in the manner of the arms of a toggle and are angled to one side, here the outer side, of the on-center or straight-in-line position.

Following this loose assembling of the insert pair 10, 20 as in Fig. 3 the wrench w is applied, with the wrench pin in the shank hole 29 and the fulcrum of the wrench engaged over the rim of the saw plate 1 in a manner to exert a turning force on the shank 20 in the counter-clockwise direction as viewed on the drawings. Such turning of the shank 20 from the Fig. 3 position moves the bit 10 down in a chordal direction along the rear wall 6 of the socket recess 5 and into the on-center position of the parts, Fig. 2.

At said Fig. 2 on-center stage the shank toggle-arm or diameter line D aligns with the other toggle-arm or perpendicular P. It is understood that the bit and shank pair 10, 20 and the socket 2 including the segmental and the angular portions 4 and 5 thereof, are so proportioned that the diametral dimension of the shank along the line D, from the leading convex side to the point on the shank toe 25 where it thrusts against the wall of the bit bearing recess 16, plus the relatively short length $P^b$ of that portion of the perpendicular P which traverses the leg 11 of the bit 10 together somewhat exceeds the diametral distance across the socket 2 from the leading segmental edge at 4 to the rear wall 6 of the angular recess at the point there intersected by the perpendicular P.

Hence in the on-center condition of Fig. 2 the shank is subject to diametral compression, with the resiliently related heel and toe portions 23, 25 forced slightly together or closed, by an amount scarcely visible to the unaided eye but in fact measurable.

Installation of the bit and shank pair is completed by continued turning of the shank 20 and chordal in-movement of the bit 10, from the on-center Fig. 2 position to the final installed and locked position of Fig. 1. There the shank toggle-arm D and the bit toggle line $P^b$ are again angularly offset, now in the downward or inward direction. This imposes a substantial down-thrusting force component on the bit, holding it in its now positively locked-in condition. The relative large angle at $a$ already mentioned, being at least 90°, contributes in this down-thrusting or in-thrusting and locking action upon the bit 10. The shank heel and toe portions 23, 25 here have reopened at least partly and to the appropriate extent to effect the locking action. Intentional unlocking and release can be had only by reverse turning of the shank 20 by the wrench w and attendant re-compression of the shank through the on-center position to the unlocked and released position of Fig. 3.

It will further be understood that within the novel principles and structural functions of the invention as herein disclosed the shape, conformation and dimensions of the parts may be varied within a considerable range and of course also may vary with the overall size of the saw plate. In some of the larger saws, for example, where the peripheral velocities and the attendant centrifugal forces run high the legs 16 of the bits 10 may be proportionately longer and the leg extensions or latches 13 and correspondingly the latch pockets 9 therefor may be extended and may be rounded or otherwise modified in shape as illustrated for example at 13x and 9x in Fig. 5a.

It will be understood that my invention, either as to method or product, is not limited to the steps or exemplary embodiments herein described or illustrated, and I set forth its scope in my following claims.

I claim:

In an inserted-tooth circular saw, a saw plate having a tooth-base and gullet presenting socket, the leading and inner portion of the socket being segmental and defined about a center within the saw plate and the trailing portion of the socket being angular and including a straight rear wall perpendicular to a diameter through the socket center and dominantly radial of the plate, said angular socket portion having at the inner end a bottom wall disposed at a general angle of at least 90° relative to said rear wall and having at the end thereof spaced forwardly of the rear wall a plane-faced abutment opposing and substantially paralleling said rear wall, a tooth bit comprising an integral invert L-shaped metal piece comprising a leg and a lateral arm with a cutter at the outer end of the latter, said tooth leg having a straight rear face for reception against said rear wall of the socket and having a front face with a medial arcuate recess for pivotal and thrust-receiving toggle-like engagement of a locking shank piece, said tooth leg extended substantially below said medial recess thereof and having a bottom end portion with a lower margin conformant to the bottom wall of the plate angular socket portion and being constituted as a positive latch for reception behind said abutment of the saw plate angular socket portion; and a locking shank piece comprising an integral crescentic metal body of overall circumferential extent of at least 180° with a convex margin described about a center such that a diameter therethrough traverses the opposed leading and trailing tips of the shank, the trailing tip having a rearwardly projective generally semi-circular heel for coaction with the medial recess of the tooth leg and described upon a center contained by the tip and in line with a diameter of the shank, the shank below said heel having a straight rear wall defined by a chord through the heel and providing a clearance space for the shank piece below the heel and forward of the plate socket abutment, the shank being conformant to the socket segmental portion and having the trailing tip formed for pivotal and thrusting engagement in the bit bearing recess and with the leading tip diametrally oppositely engageable with said socket portion along a line essentially circumferential of the saw plate and the bit leg and the shank being dimensioned diametrally of the socket to afford a cross-center toggle locking action with respect to the bit under bodily rotation of the shank and chordal sliding of the bit such that centrifugal force during high-speed running of the saw imposes minimum unlocking effort on the shank and bit.

References Cited in the file of this patent
UNITED STATES PATENTS

| Number | Name | Date |
| --- | --- | --- |
| 57,088 | Clemson | Aug. 14, 1866 |
| 190,062 | Miller | Apr. 24, 1877 |
| 286,478 | O'Grady | Oct. 9, 1883 |
| 315,419 | Krieger | Apr. 7, 1885 |
| 495,729 | Emerson | Apr. 18, 1893 |
| 1,240,331 | Free | Sept. 18, 1917 |
| 1,337,016 | Jenkins | Apr. 13, 1920 |
| 1,831,705 | Freas | Nov. 10, 1931 |
| 2,122,196 | Miner et al. | June 28, 1938 |